United States Patent Office 3,056,502
Patented Oct. 2, 1962

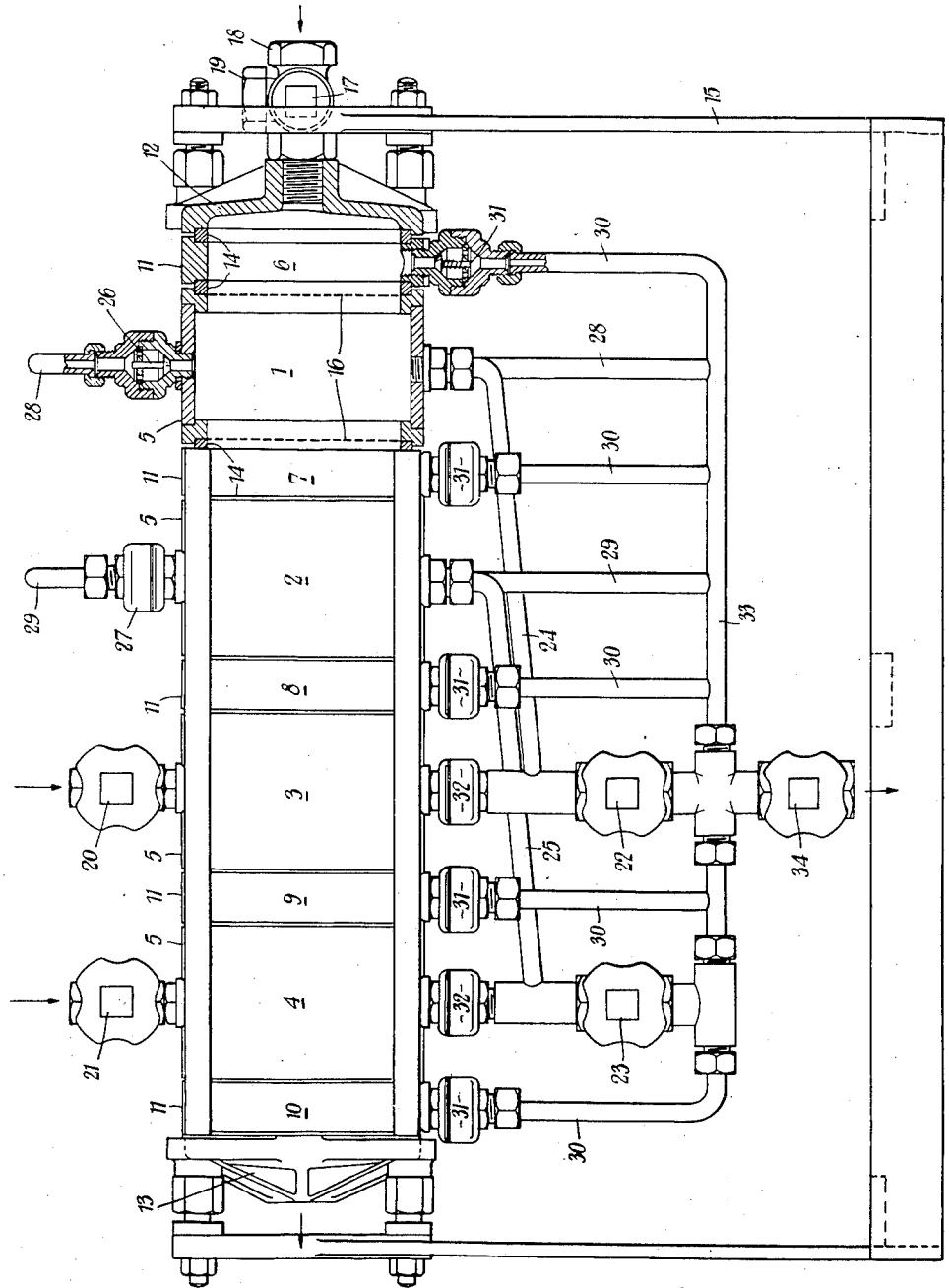

3,056,502
LIQUID TREATMENT DEVICES
John Frederick Zwicky, Chalfont St. Giles, England, assignor to Stone-Wallwork Limited, London, England
Filed Oct. 30, 1956, Ser. No. 619,147
2 Claims. (Cl. 210—190)

This invention concerns improvements relating to fluid-treatment apparatus such, for example, as apparatus for the purification or de-salinification of water. The invention is particularly advantageous in its application to apparatus, such as ion-exchange apparatus, in which the fluid is passed through a plurality of different treatment materials in succession and it is necessary that the said materials should periodically be regenerated or similarly acted upon by different liquid agents without the said agents becoming mixed.

According to the invention fluid-treatment apparatus comprises a series of alternate treatment cells and non-treatment cells (hereinafter referred to as "empty" cells) separated by micro-porous diaphragms and flow control means whereby, during a phase of fluid treatment, the fluid to be treated can be caused to pass through all the cells in series and, during a phase of regeneration or like action upon treatment material contained in the treatment cells, liquid for that purpose can be caused to pass transversely across the treatment cells only, while the empty cells are free of liquid. Preferably, the diaphragms are made of micro-porous, unplasticised, polyvinyl chloride in sheet form.

Such apparatus has the advantage that the regenerating or like agent or agents can be prevented from escaping from the treatment cells while passing across the same in the regeneration or like phase, although the fluid to be treated can be made to pass through all the cells in series during the treatment phase. This is particularly advantageous for apparatus in which the treatment cells comprise cells containing different treatment materials requiring regenerating or like agents which are different and require to be prevented from mixing or reacting with each other during the regenerating or like phase.

One embodiment of the invention will now be more fully described by way of example and with reference to the accompanying drawing which illustrates liquid-treatment apparatus in a side elevation, partially in section.

The apparatus illustrated comprises a plurality of treatment cells 1, 2, 3, 4 formed by similar rings 5, a plurality of "empty" cells 6, 7, 8, 9, 10 formed by a series of similar, but narrower, rings 11 and inlet and outlet end covers 12 and 13 respectively. Between the end covers, there are alternately an empty cell 6, a treatment cell 1, an empty cell 7 and so on. The cells are assembled and clamped together to form a tubular series or cylindrical horizontal column after the known fashion of a filter press, adjacent cells being abutted against each other through sealing rings 14. The whole apparatus is supported in a frame 15. Each of the treatment cells, 1 to 4, is separated from respective adjacent empty cells, 6 to 10, by micro-porous diaphragms 16 clamped at the edges between the rings 5 and the adjacent sealing rings 14. The arrangement of the rings and diaphragms is shown clearly in the sectioned portion of the drawing and is repeated for each of the following treatment cells.

A preferred material for the micro-porous diaphragm is pure unplasticised polyvinyl-chloride sheet having a uniform pore size and a high percentage of voids. An excellently suitable material is that sold under the registered trademark "Porvic."

For the example illustrated, it has been assumed that the liquid treatment involves the subjection of the liquid to two different treatment materials in succession and that the liquid is to be passed through this succession of treatment materials twice. The two treatment materials require to be periodically regenerated by different liquid regenerating agents. Accordingly the cells 1 and 3 are filled with one treatment material and the cells 2 and 4 with the other type of material.

An appropriate arrangement of valves and ducts for this combination of treatment cells will now be described: Connected to the inlet-end cover 12 is a two-way cock 17 for admitting, alternatively, liquid to be treated from the inlet 18 and air and/or wash water from the inlet 19. The upper parts of the cells 3 and 4 are connected to supplies of the different regenerating agents through closable control valves 20 and 21 respectively. The lower parts of the cells 3 and 4 are connected, at points diametrically opposite to the aforesaid connections, to closable drain valves 22 and 23 respectively. From the upstream sides of the valves 22 and 23, branch ducts 24 and 25 lead to the lower parts of the cells 1 and 2. The upper parts of the cells 1 and 2 are connected through downwardly closing, lightly gravity-loaded, non-return valves 26 and 27 to drain pipes 28 and 29 respectively. The lower parts of the empty cells 6 to 10 are each connected to a drain pipe 30 through an upwardly closing non-return valve 31 which is lightly spring-loaded. Similar non-return valves 32 are provided between the cells 3 and 4 and the valves 22 and 23 respectively. The valves 22 and 23 and the drain pipes 28 to 30 are all connected to a manifold 33 leading to a common main drain valve 34.

The operation of the above described apparatus is as follows: For a liquid-treatment phase, all of the valves 20, 21, 22, 23 and 34 are closed and the valve 17 is set to admit the liquid under pressure. The liquid passes through all the treatment and empty cells in series and is discharged at the outlet end 13. In this manner, the liquid will be subjected to the treatment actions of the different treatment materials in the cells 1 and 2, 3 and 4.

For a regeneration phase, the valve 17 is first turned to cut off the liquid inlet at 18 and to admit air under low pressure at 19 and all of the drain valves 22, 23 and 34 are opened. When the apparatus is completely drained of liquid, the valves 22 and 23 are closed and the valves 20 and 21 are opened to admit the regenerating agents under low pressure. The respective regenerating agents thus flow downwardly across the cells 3 and 4, thence through the connections 24, 25, upwardly across the cells 1 and 2 and away through the pipes 28 and 29, the manifold 33 and the open main drain valve 34. Each regenerating agent passes through the two cells, 3, 1 and 4, 2, containing the treatment material for whose requirements it is appropriate. The rates of flow of the regenerating agents can be adjusted by means of the valves 20 and 21. It will be noted that each of the empty cells 6 to 10 will have been completely drained and filled with air and that it is in communication, past the lightly loaded non-return valve 31, with the open drain valve 34. Consequently, at this stage the cells 6 to 10 constitute drained air spaces or air gaps bounding the respective treatment cells 1 to 4. As it is characteristic of micro-porous diaphragms under these conditions that a certain critical minimum pressure must be applied on the liquid side before liquid flow will commence through the diaphragms to the air side, it is readily possible to ensure that such flow does not occur during the regeneration phase. It is only necessary to arrange that the pressure heads on the regenerating agents are less than the critical pressure head required to overcome the resistance of the diaphragms. Consequently, it is possible to prevent escape of the regenerating agents from the respective cells, 3, 1 and 4, 2, across which the said agents are flowing. Thus adjacent treatment cells, separated only by an empty cell, can have their treatment materials regenerated by different agents, for instance strong acid and strong alkali respectively, without danger of the two agents mixing or reacting with each other.

When regeneration has been completed, the valves 20 and 21 are closed and the valves 22 and 23 are opened to permit the regenerating agents to drain away through the main drain valve 34. The valves 22 and 23 are then closed and the inlet valve 17 is turned to admit liquid gently at 18, the valve 34 being finally closed to leave the apparatus ready for the next treatment phase.

The above-described apparatus would, for example, be suitable for water-purification treatment by an ion-exchange process, the cells 1 and 3 being filled with, say, a strong acid cation exchanger and the cells 2 and 4 with, say, a strong base anion exchanger. Suitable regenerating agents would then be dilute hydrochloric acid for the cells 1 and 3 and dilute sodium hydroxide solution for the cells 2 and 4.

As will be understood, however, the nature of the treatment materials and regenerating or similar agents, and the number, size, sequence and construction of the cells, and the nature of the micro-porous diaphragms will depend upon the requirements of particular cases. If necessary, the retention of the treatment materials within their cells may be assisted by gauzes or the like supporting the micro-porous diaphragms. Gauzes may also be provided at the ports of the treatment cells to prevent loss of treatment materials at these points. In ion-exchange processes such as have just been referred to, if the liquid treated is an electrolyte, all parts coming into contact with the liquid will be made of material having a high electrical resistance in order that there shall be as little loss as possible of ionic charge from the cation and anion exchangers while the liquid is passing through.

If required, wash water may be admitted at 19, should it be necessary on occasion to flush the apparatus. As will be evident, furthermore, the apparatus can readily be disassembled for cleaning, recharging or the like.

The loading of the non-return valves 26, 27, 31, 32 will depend upon the micro-porous material used. With the polyvinyl-chloride sheet material referred to above, these valves may suitably be arranged to open at a pressure within the range between 0.5 and 8.0 pounds per square inch.

Although the invention is more particularly applicable to apparatus for the treatment of liquids, it can be applied to the treatment of gases. For example, it could be applied to ion-exchange treatment for the purification of air containing droplets or particles, including metallic radicals, for instance the purification of so-called "smog."

I claim:

1. In fluid treatment apparatus especially for ion exchange purposes, a series of alternate empty cells and treatment cells containing alternately anion and cation resins separately, micro-porous diaphragms separating said treatment cells and empty cells, said diaphragms having a specific critical pressure above which fluid will pass, an inlet and an outlet located at the ends of said series, means to control the pressure of the fluid to be treated above said critical pressure whereby, during the fluid treatment phase, the fluid to be treated is caused to pass through all the cells in the direction of said series of cells, a controllable outlet for fluid for each empty cell, and a controllable inlet and a controllable outlet for regenerating fluid for each treatment cell located on the sides of the treatment cells transverse of the said direction, means to control the regenerating fluid pressure below a predetermined pressure, the critical pressure of said micro-porous diaphragms being greater than said predetermined pressure, whereby during the regeneration phase of the treatment material contained in the treatment cells, fluid for that purpose is caused to pass transversely across the treatment cells only.

2. A fluid treatment apparatus according to claim 1 and means for introducing another fluid under pressure into all of said cells to clear said cells of the treatment fluid and regenerating fluid.

References Cited in the file of this patent

UNITED STATES PATENTS

| | | |
|---|---|---|
| 590,868 | Wanner et al. | Sept. 28, 1897 |
| 791,647 | Pfautz | June 6, 1905 |
| 2,127,791 | Stevens et al. | Aug. 23, 1938 |
| 2,297,248 | Rudolph | Sept. 29, 1942 |
| 2,660,558 | Juda | Nov. 24, 1953 |
| 2,783,894 | Lovell | Mar. 5, 1957 |

FOREIGN PATENTS

| | | |
|---|---|---|
| 125,495 | Australia | Oct. 2, 1947 |